United States Patent
Cobos et al.

(10) Patent No.: US 12,545,165 B2
(45) Date of Patent: Feb. 10, 2026

(54) RETAINER INSERT FOR A HEADREST SLEEVE DEVICE, A SLEEVE DEVICE ASSEMBLY THEREOF

(71) Applicant: ILLINOIS TOOL WORKS INC., Glenview, IL (US)

(72) Inventors: Marc Cobos, Barcelona (ES); Jordi Vilanova, Barcelona (ES)

(73) Assignee: ILLINOIS TOOL WORKS INC., Glenview, IL (US)

( * ) Notice: Subject to any disclaimer, the term of this patent is extended or adjusted under 35 U.S.C. 154(b) by 246 days.

(21) Appl. No.: 18/455,349

(22) PCT Filed: Mar. 3, 2022

(86) PCT No.: PCT/US2022/018678
§ 371 (c)(1),
(2) Date: Aug. 24, 2023

(87) PCT Pub. No.: WO2022/187466
PCT Pub. Date: Sep. 9, 2022

(65) Prior Publication Data
US 2024/0294102 A1    Sep. 5, 2024

(30) Foreign Application Priority Data
Mar. 4, 2021    (EP) ..................................... 21382184

(51) Int. Cl.
*B60N 2/897*    (2018.01)
*B60N 2/809*    (2018.01)

(52) U.S. Cl.
CPC ............. *B60N 2/897* (2018.02); *B60N 2/809* (2018.02)

(58) Field of Classification Search
CPC ..................................................... B60N 2/897
See application file for complete search history.

(56) References Cited

U.S. PATENT DOCUMENTS 5,823,623 A    10/1998    Beck
9,902,301 B2    2/2018    Aquillue
(Continued)

FOREIGN PATENT DOCUMENTS

CA    2200808 A1 *    9/1997    ............. B60N 2/826
DE    69928345 T2    8/2006
(Continued)

OTHER PUBLICATIONS

International Searching Authority, Search Report and Written Opinion issued in corresponding PCT Application No. PCT/US2022/018678 mailed May 16, 2022, 10 pages.

*Primary Examiner* — David R Dunn
*Assistant Examiner* — Tania Abraham
(74) *Attorney, Agent, or Firm* — THOMPSON HINE LLP

(57) ABSTRACT

A retainer insert for an inner axial passage of a headrest sleeve device includes a first annular spring clip, and a second annular spring clip, coaxial to and axially spaced apart from the first annular spring clip along a longitudinal central axis. Each annular spring clip is adapted to be received and mounted within the axial passage of the headrest sleeve device. A plurality of incurvate flex members are arranged parallel to and circumferentially spaced apart about the longitudinal central axis and connect the first and said second annular spring clip, and are adapted to biasedly engage with a headrest support rod.

17 Claims, 8 Drawing Sheets

(56) References Cited

U.S. PATENT DOCUMENTS

| | | | |
|---|---|---|---|
| 2009/0243364 A1* | 10/2009 | Brunner | B60N 2/815 297/391 |
| 2016/0176324 A1* | 6/2016 | Otto | F16C 33/26 384/282 |
| 2019/0143865 A1 | 5/2019 | Hagan | |
| 2021/0300223 A1 | 9/2021 | Moreno | |
| 2022/0289087 A1 | 9/2022 | Bielsa Bonet | |

FOREIGN PATENT DOCUMENTS

| | | |
|---|---|---|
| DE | 112012001820 T5 | 1/2014 |
| EP | 1690732 B1 | 8/2011 |
| EP | 2749448 A1 | 7/2014 |
| EP | 2851238 A1 | 3/2015 |
| FR | 3010011 A1 | 3/2015 |
| KR | 20180001205 U | 5/2018 |
| WO | WO-20220187466 A1 | 9/2022 |

* cited by examiner

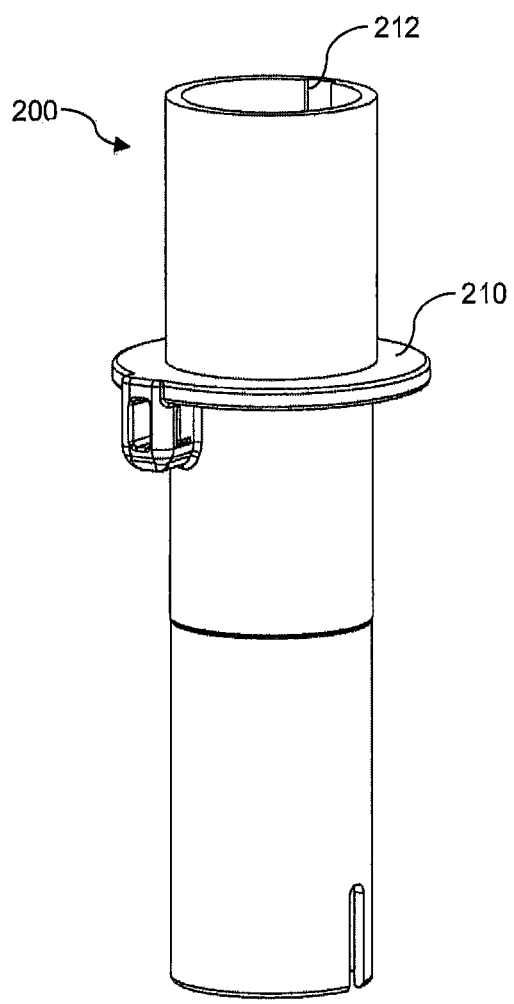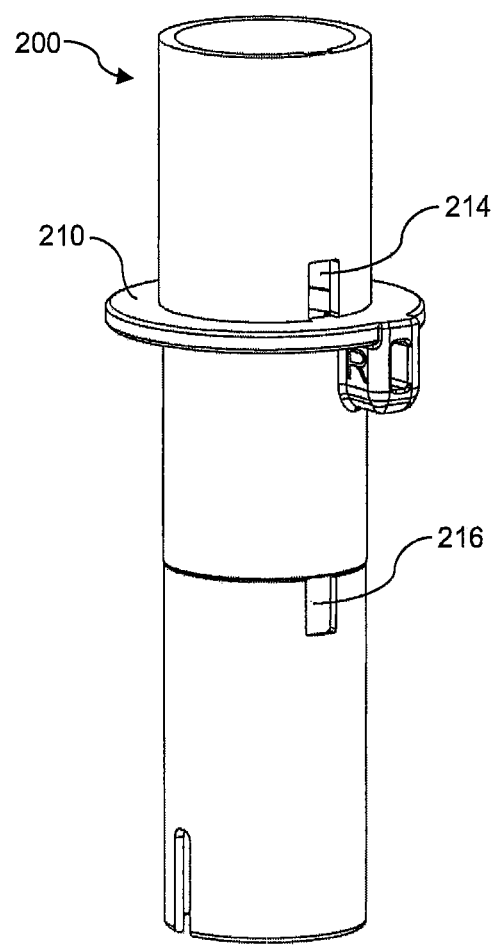
FIG. 7A
FIG. 7B

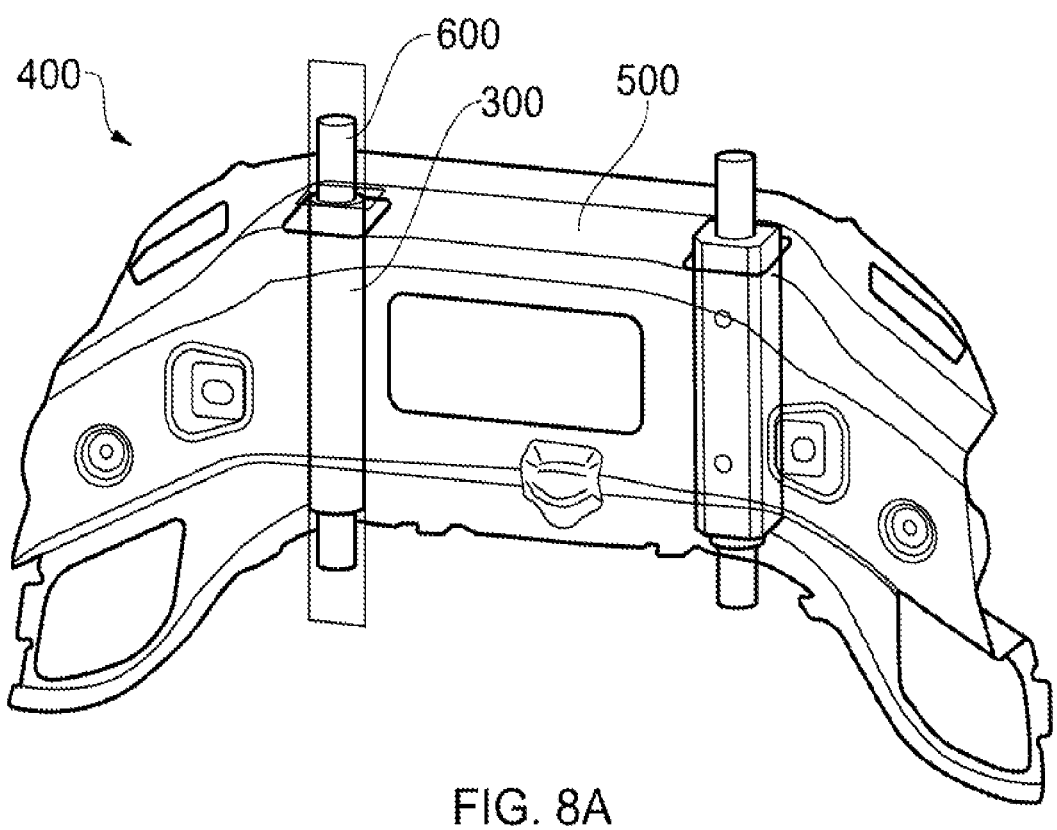
FIG. 8A
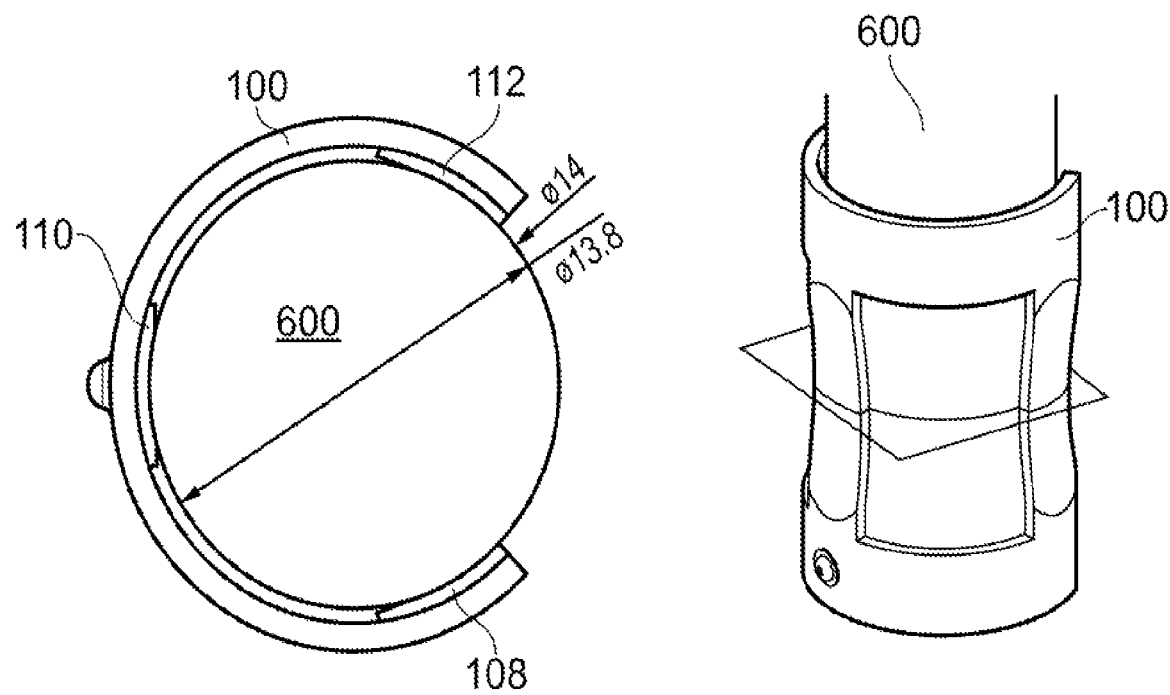
FIG. 8B
FIG. 8C

RETAINER INSERT FOR A HEADREST SLEEVE DEVICE, A SLEEVE DEVICE ASSEMBLY THEREOF

TECHNICAL FIELD

The present invention relates to a retainer insert or clip for a headrest sleeve device. In particular, the present invention relates to a retainer insert for an inner axial passage of a headrest sleeve device, for tolerance compensation and alignment. The present invention also relates to a sleeve device assembly including one or more sleeves (for the headrest rods) and respective retainer insert.

BACKGROUND

A sleeve device for a headrest used in automotive applications usually includes a tubular body with an inner axial passage to accommodate a rod of a headrest. Typically, two spaced parallel headrest rods are inserted into a sleeve arrangement, which together are fixed onto a frame of a back rest. The rods are often bent into a U-shape, and the bridge of the U-shaped rods is located inside the headrest.

Generally, a sleeve device is designed and sized for a specific vehicle seat frame and for a specific size and configuration of rod. As a result, many designs of sleeve devices are available, particularly since any alterations to the seat frame or rod require a corresponding alteration to the sleeve device. In addition, each of the sleeve device, seat frame and rod are subject to tolerances when they are manufactured and assembled, which results in slack and/or misalignment between the rod and the sleeve. This is problematic since the interaction between sleeve device and the rod must be so that it is sufficiently tight to minimise rattling, but also sufficiently loose to enable the rod to allow axial movement within the sleeve device in order to alter the height of the headrest.

To compensate for these tolerances while maintaining slack between the rods and the sleeve device, it is known to pre-stress the headrest rods inside the sleeve body using a resilient element and/or to provide a low friction sleeve to reduce the clearance between them. Examples of these arrangements are shown in EP1609665 and EP2749448, which involve regulating the sliding movement of the rod within the inner passage of the sleeve, to take up the slack between them. However, the pre-stressing of headrest rods is an additional process step, which is time-consuming and adds to the complexity of the manufacturing process. Furthermore, currently available resilient elements (for pre-stress) are typically integral parts of the sleeve, thus, any damage to these elements would require a replacement of the entire sleeve device adding costs to the user.

Consequently, it would be desirable to provide for a sleeve device that is able to accommodate a range of headrest rods of different diameters without the need to pre-stress the headrest rods. It would also be desirable to provide an improved and simpler alternative arrangement for tolerance compensation for a sleeve device. Furthermore, it would be desirable to provide for a sleeve device allowing simple replacement of any damaged pre-stress element (resilient element) to minimise costs for repair or replacement in the event of wear and tear.

The present invention provides a retainer insert for an inner axial passage of a headrest sleeve device. The present invention also provides an alternative sleeve device to the existing prior art.

SUMMARY OF THE INVENTION

Viewed from an aspect of the present invention, there is provided a retainer insert for an inner axial passage of a headrest sleeve device. The retainer insert comprises:
 a first annular spring clip and a second annular spring clip, coaxial to and axially spaced apart from the first annular spring clip along a longitudinal central axis, each one adapted to be received and mounted within the axial passage of the headrest sleeve device;
 a plurality of incurvate flex members, arranged parallel to and circumferentially spaced apart about the longitudinal central axis and connecting the first and the second annular spring clip, adapted to biasedly engage with a headrest support rod.

Thus, the incurvate flex members of the retainer insert are able to bias against and engage a headrest support rod, taking up the slack between the sleeve device and the rod. This arrangement is advantageous because a single sleeve device is able to accommodate rods of different diameters and configurations, compensating for any manufacturing and assembly tolerances. By providing a retainer insert with incurvate flex members, a simple arrangement is provided for tolerance compensation, so that vibrations (rattling) of the sleeve device and rod are minimised by reducing clearance between the sleeve device and rod (pre-stressing), while allowing for sufficient sliding movement of the rod within the sleeve device to alter the height of a headrest. Furthermore, one or more inserts of the present invention is/are removably mounted within the axial passageway of the sleeve. Thus, in the event of damage through wear or inappropriate use, the insert may simply be removed and replaced with a new insert in order to regain full functionality without having to replace the whole sleeve device assembly. This can greatly reduce costs and adds to the sustainability of the product.

Advantageously, in some embodiments, each one of the first and the second annular spring clip are open-type clips adapted to retainingly engage within the inner axial passage of the headrest sleeve.

Advantageously, in some embodiments, the retainer insert further comprises at least one catch member provided on an outer surface of any one of the first and the second annular spring clip projecting in a direction radially away from the longitudinal central axis, adapted to mountably engage with a corresponding aperture of the headrest sleeve device.

In some specific embodiments, a footprint of the at least one catch member operably complements the footprint of the corresponding aperture of the headrest sleeve device, so as to allow a mating connection between the at least one catch member and the corresponding aperture of the headrest sleeve device.

In some specific embodiments, the footprint of the at least one catch member is substantially rectangular.

Advantageously, in some embodiments, the at least one catch member comprises a chamfered cam surface adapted to slidingly engage with an inner surface of the inner axial passage of the headrest sleeve and move into engagement with the corresponding aperture of the headrest sleeve device during assembly.

In some embodiments, the first annular spring clip, the second annular spring clip and the plurality of incurvate flex members are integral parts made from a resilient material.

In some embodiments, the retainer insert comprises three circumferentially equidistantly spaced incurvate flex members.

In some embodiments, each one of the plurality of incurvate flex member has a concave shape with respect to the longitudinal central axis.

Viewed from another aspect of the present invention, there is provided a sleeve device assembly for a vehicle headrest. The sleeve device assembly comprises:

- a sleeve device, having a tubular wall defining an inner axial passage between a proximal end and a distal end extending along a longitudinal central axis;
- at least one first retainer insert, operably mounted within the inner axial passage of the sleeve device, adapted to retainingly receive and guide a headrest support rod.

Advantageously, in some embodiments, the tubular wall of the sleeve device comprises at least one first aperture towards a proximal region adapted to mountingly engage with a catch member of the at least one retainer insert.

Advantageously, in some specific embodiments, the sleeve device assembly further comprises at least one first annular shoulder portion provided adjacent to the at least one first aperture within the inner axial passage and configured to abuttingly engage with the at least one first retainer insert when the catch member is mountingly engaged with the at least one first aperture.

In some specific embodiments, the at least one first aperture is provided within a longitudinal groove provided on an inner surface of the tubular wall and extending between the distal end and the proximal end in a direction parallel to the longitudinal central axis.

In some specific embodiments, the longitudinal groove has a width configured to operably receive the catch member of the at least one first retainer insert.

In some specific embodiments, the sleeve device assembly comprises at least one first retainer insert and a second retainer insert, each one operably mounted within the inner axial passage of the sleeve device at opposing proximal and distal end portions of the tubular wall, adapted to cooperate so as to retainingly receive and guide a headrest support rod. This provides the advantage of allowing to finetune the biasing force or pre-stress to the rod(s) to optimise the desired function, i.e. one or more inserts of different dimensions or thickness with varying biasing capability may be used to achieve a desired pre-stress characteristic.

BRIEF DESCRIPTION OF THE DRAWINGS

Embodiments of the invention are now described, by way of example only, hereinafter with reference to the accompanying drawings, in which:

FIGS. 7A-7B illustrate example embodiments of a pair of sleeve devices suitable for a headrest for a car seat, showing a left-side sleeve, and a right-side sleeve, respectively, and FIGS. 8A-8C illustrate the insert and sleeve device assembly of the present invention in use, showing a headrest frame assembly including a headrest frame (car seat) with installed sleeve assemblies (left and right) and respective headrest rods inserted into the sleeve assemblies, a cross-sectional top view of a retainer insert engaged with a headrest rod, and a perspective side view of a retainer insert engaged with a headrest rod, respectively.

DETAILED DESCRIPTION

Figure 1A:
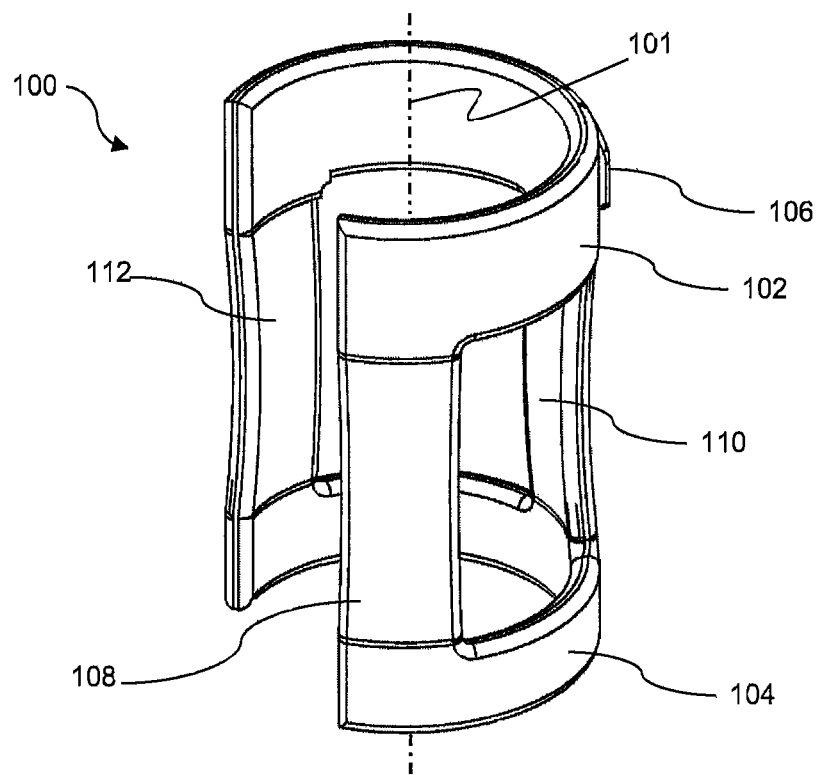
FIGS. 1A-1B illustrate perspective top side views of a retainer insert from a first side, and a second side.
Figure 1B:
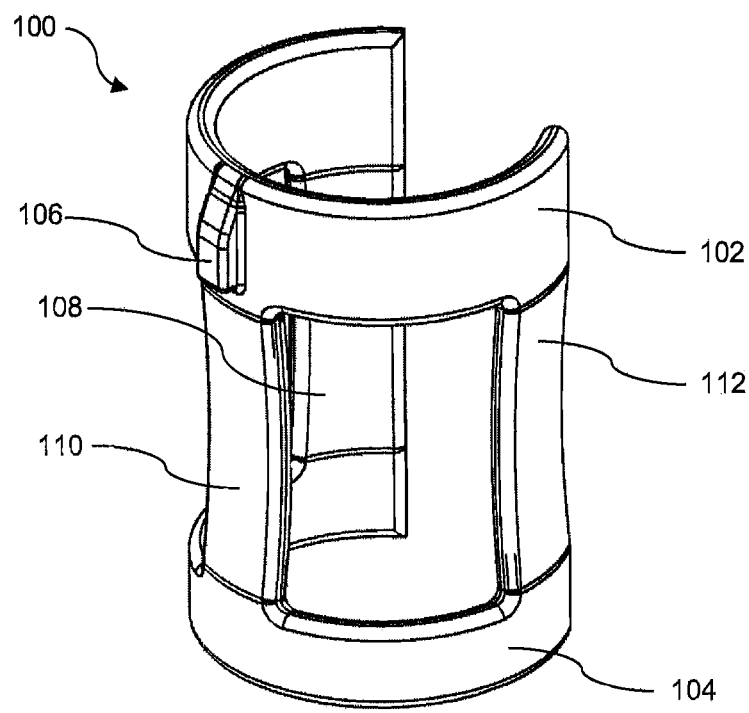
Figure 2A:
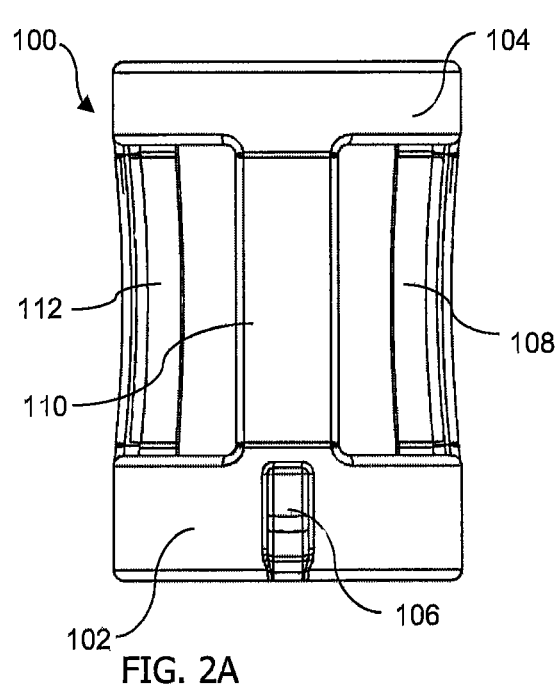
FIGS. 2A-2D illustrate an example embodiment of the retainer insert of FIGS. 1A-1B from the front, the back, the side, and the top, respectively.
Figure 2B:
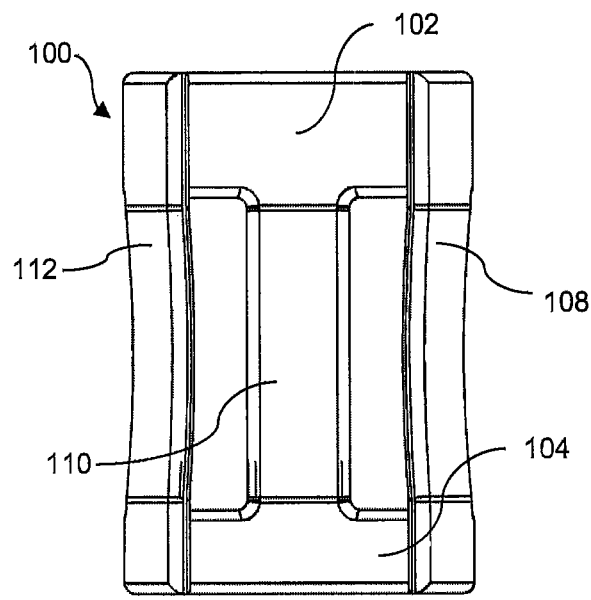
Figure 2C:
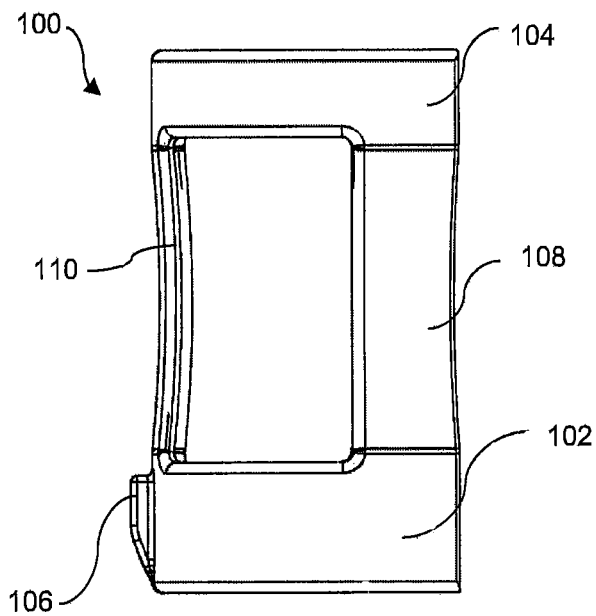
Figure 2D:
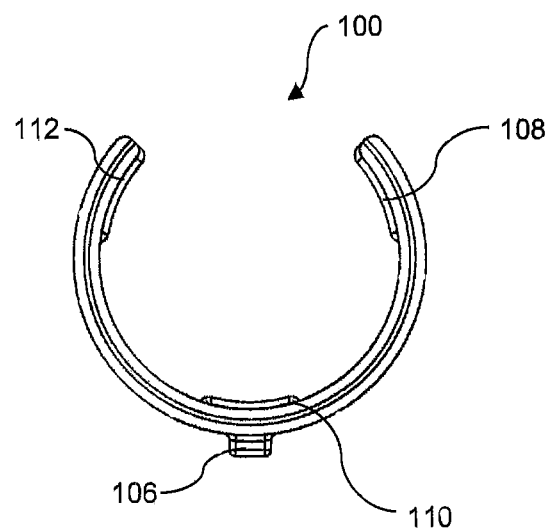

Certain terminology is used in the following description for convenience only and is not limiting. The words 'right', 'left', 'lower', 'upper', 'front', 'rear', 'upward', 'down' and 'downward' designate directions in the drawings to which reference is made and are with respect to the described component when assembled and mounted. The words 'inner', 'inwardly' and 'outer', 'outwardly' refer to directions toward and away from, respectively, a designated centreline or a geometric centre of an element being described (e.g. central axis), the particular meaning being readily apparent from the context of the description.

Further, as used herein, the terms 'connected', 'attached', 'coupled', 'mounted' are intended to include direct connections between two members without any other members interposed therebetween, as well as, indirect connections between members in which one or more other members are interposed therebetween. The terminology includes the words specifically mentioned above, derivatives thereof, and words of similar import.

Further, unless otherwise specified, the use of ordinal adjectives, such as, "first", "second", "third" etc. merely indicate that different instances of like objects are being referred to and are not intended to imply that the objects so described must be in a given sequence, either temporally, spatially, in ranking or in any other manner.

Like reference numerals are used to depict like features throughout.

Referring firstly to FIGS. 1A-1B and 2A-2D, there is shown an example embodiment of a retainer insert 100. The retainer insert 100 has a generally cylindrical shape (i.e. an open-type clip). More specifically, the retainer insert 100 has a C-shaped spring clip 102 formed at a top portion and another C-shaped spring clip 104 formed at its opposite bottom portion. Although, in this example embodiment, the spring clips 102, 104 are described as open-type clips in the form of a C-shape, other suitable shapes are envisaged For example, closed-type clips may be used that are simple slid into the axial passage of the sleeve 200 so as to receive the rod of the headrest. However, open-type clips are preferable, because of its ease of use during deformation when inserting the retainer insert 100 into the sleeve 200 and biasingly engaging with the inner wall of the sleeve 200. The spring clips 102, 104 are arranged coaxial to and spaced apart from one another about their common longitudinal central axis 101. More specifically, the spring clips 102, 104 are spaced apart from one another by three flexible arms 108, 110, 112, each one arranged parallel to the longitudinal central axis 101. The flexible arms 108,110,112 are circumferentially equidistantly spaced apart about the longitudinal central axis 101 of the retainer insert 100, as best seen from FIG. 2D. The arms 108,110,112 are each incurvate, meaning that they curve inwards towards the central axis 101 so as to form a three-point contact with an inserted (circular) rod. As such, the flex arms 108,110,112 have a concave shape with respect to the longitudinal central axis 101. Since the arms 108,110, 112 are incurvate, the parts of the arm 108,110,112 proximal the respective spring clips 102,104 are greater in distance from the central axis 101, whereas the parts of the flexible arms 108, 110,112 distal to the respective spring clips 102,104 (i.e. generally a central portion of the flex arm) are closer in distance to the central axis 101, thus, providing a first point of contact with an inserted rod. In this example embodiment, the first spring clip 102, the second spring clip 104, and the three flexible arms 108,110,112 are integrally formed from a single resilient material. For example, a resilient polymer (e.g. thermoplastic polymer) or metal or spring metal) capable of flexure.

A catch member 106 (i.e. a projection) is formed on an outer surface of one of the spring clips 102, 104 (see FIGS. 1A-1B and 3A-3B). In this particular example, the catch member 106 is provided on the first spring clip 102. The catch member 106 projects in a direction radially away from the longitudinal central axis 101 of the retainer insert 100. Furthermore, in this particular example embodiment, a single catch member 106 is formed on the first spring clip 102, however, it is envisaged that one or more additional catch member(s) 106 may be provided at different locations of the insert 100, e.g. on the second spring clip 104. I.e., a catch member 106 may be provided on each one of the first and the second spring clip 102,104.

Figure 3A:
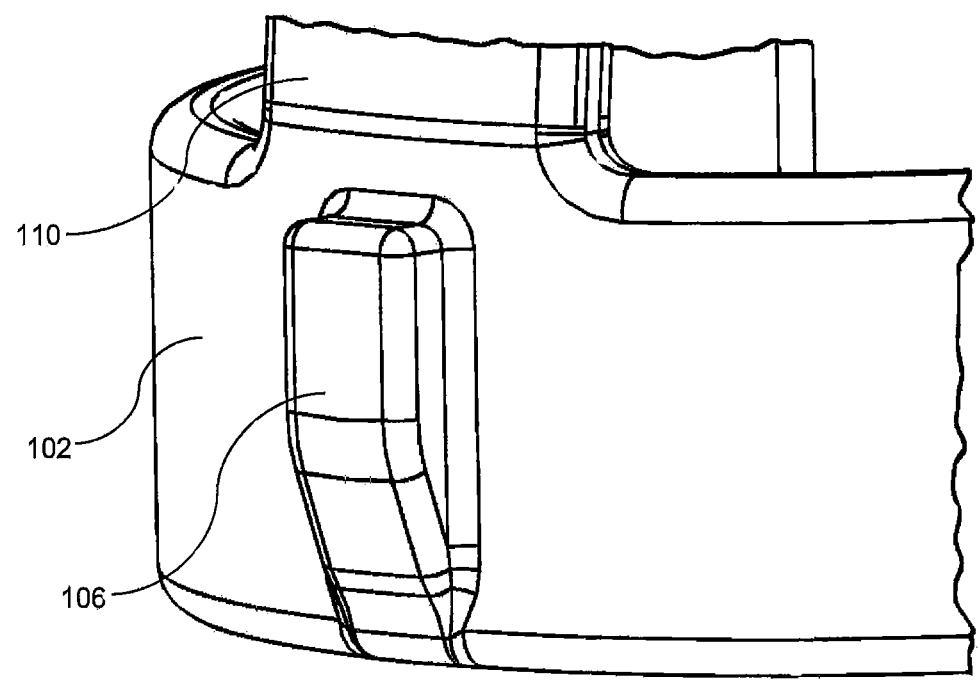
FIGS. 3A-3B illustrate a portion of the retainer insert, showing a catch member projecting from the surface of the retainer insert in a close-up perspective side view and in a cross-sectional side view, respectively.
Figure 3B:
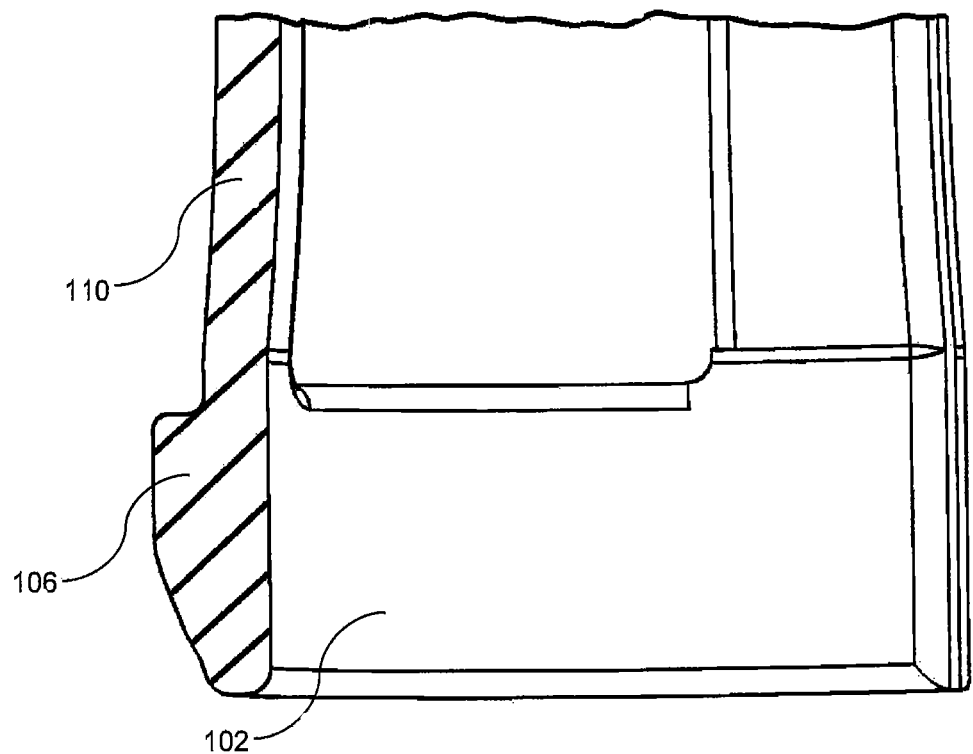
Figure 4A:
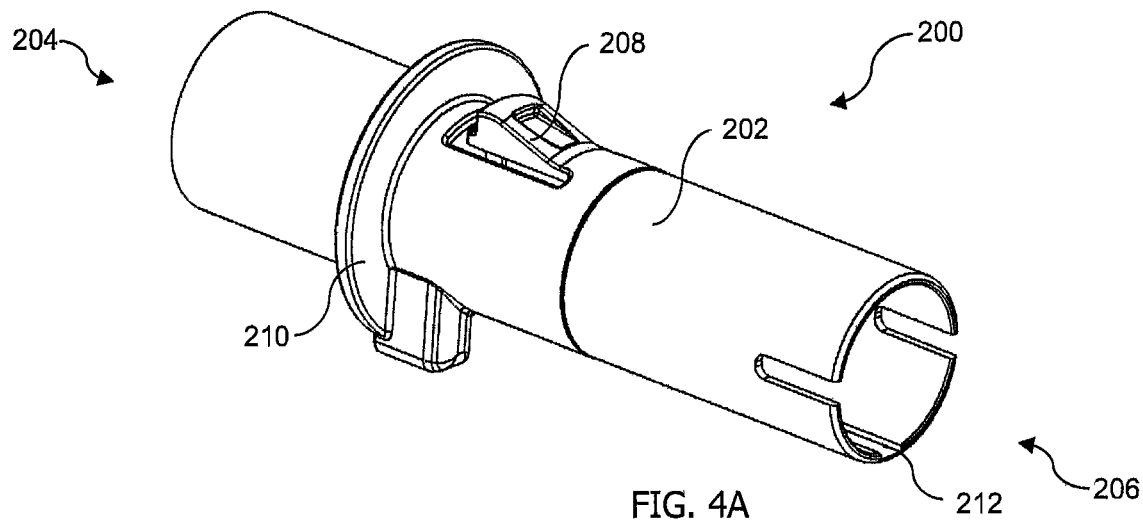
FIGS. 4A-4C illustrate a sleeve suitable to receive a headrest rod, in a perspective side view, a cross-sectional view along a first central longitudinal plane, and cross sectional view along a second central longitudinal plane (normal to the first central longitudinal plane), respectively.
Figure 4B:
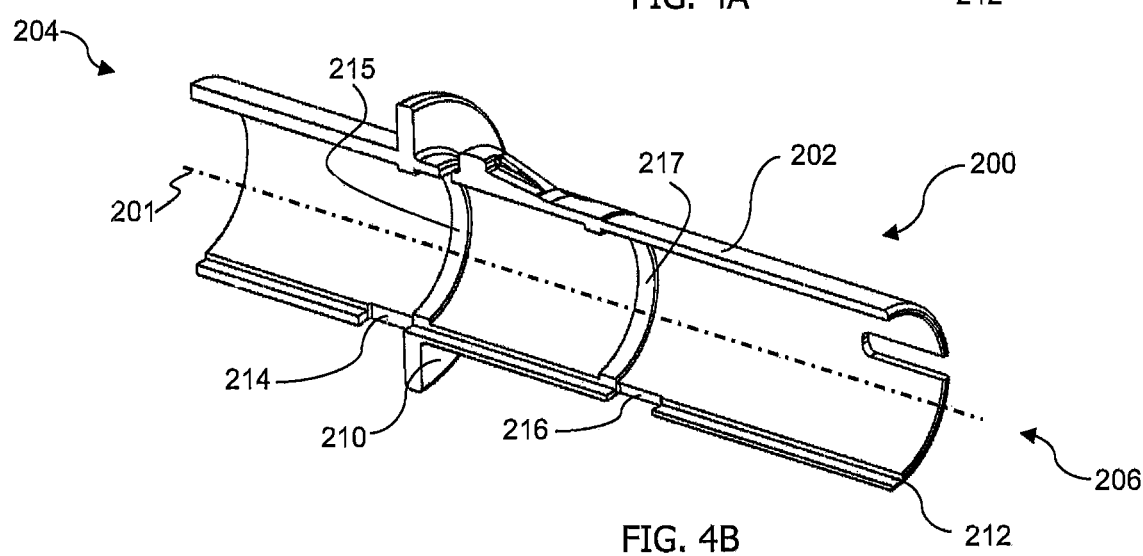
Figure 4C:
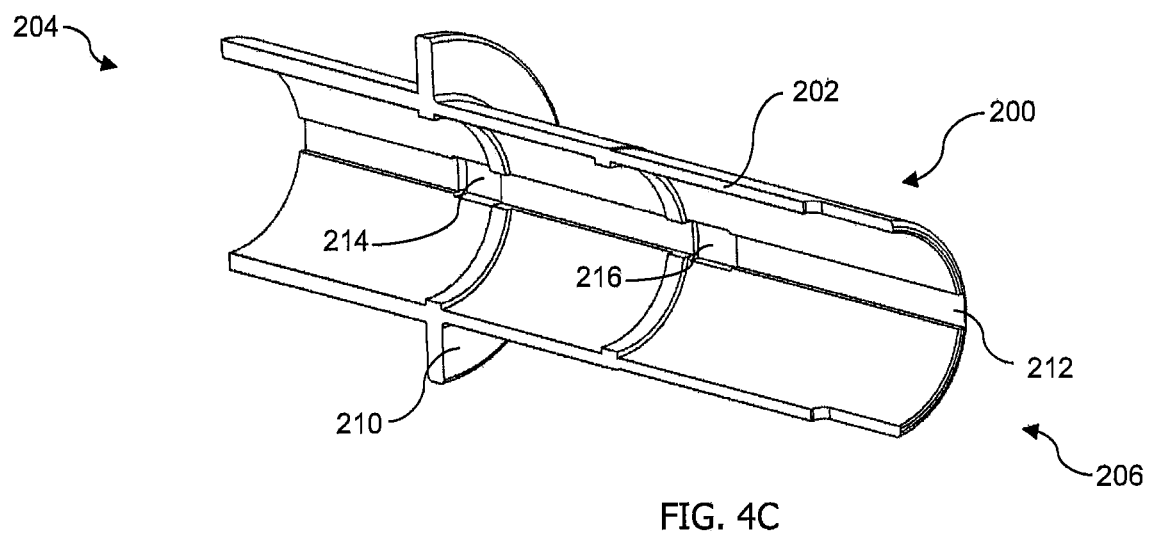

As shown particularly in FIGS. 3A-3B, the catch member 106 of this example embodiment has a substantially rectangular shape (i.e. a substantially rectangular footprint), where a lower portion of the catch member 106 terminates at a distal edge of the retainer insert 100 (i.e. the edge of the insert 100 that is pushed into the sleeve 200 first during assembly). The catch member 106 extends substantially the entire width of the first spring clip 102 having a chamfered cam surface facing towards the distal edge of the retainer insert 100. In particular, a slanted surface is provided to facilitate insertion of the retainer insert 100 into the sleeve 200 during assembly until the catch member snaps into a respective aperture 216 of the sleeve 200. It is understood by the person skilled in the art that the shape of the catch member 106 is not limited to the chamfered cuboid shape of this example embodiment, and any other suitable shape may be used (e.g. a rounded cylindrical protrusion, a wedge-shaped protrusion etc.).

An example embodiment of a sleeve 200 is now described with reference to FIGS. 4A-4C, 5 and 6A-6C. The sleeve or sleeve device 200 is typically used as a pair (i.e. a left side sleeve and a right side sleeve) to receive the two rods from a typical headrest (e.g. for a car seat). The left-side sleeve and right-side sleeve are alike, but one may be a mirror copy of the other.

The sleeve 200 has a substantially tubular wall 202 extending between a proximal end 204 (the end portion facing out of the seat or frame when installed) and a distal end 206 (the end portion embedded within the seat or frame). The tubular wall 202 defines an inner axial passage which extends along a longitudinal central axis 201. A flange member 210 is provided towards the proximal end 204 and an external fastening clip 208 is provided adjacent to the flange member 210 towards the distal end portion on or within the tubular wall 202. The flange member 210 and fastening clip 208 are configured to mount and secure the sleeve 200 to the headrest frame (500, see FIG. 8A) of the car seat. Furthermore, a first and second aperture 214,216 are provided so as to extend through the tubular wall 202. The first aperture 214 is provided adjacent to and proximal of the flange member 210, and the second aperture 216 is provided towards the distal end 206 of the sleeve 200. A first 215 and second inner shoulder 217 is provided on the inner surface of the tubular wall 202, each one located adjacent to a respective first and second aperture 214, 216 so as to provide an abutment seat for a retainer insert 100 that is moved into the axial passage of the sleeve 200. In particular, each one of the first and second inner shoulder 215, 217 is located at the edge of the aperture 214, 216 that is further away from respective proximal 204 and distal end 206. A longitudinal groove 212 extends along the inner surface if the tubular wall 202 between the proximal end 204 and the distal end 206 and axially aligned with the first and second aperture 214, 216 of the sleeve 200. For this particular example embodiment, the width of the groove 212 corresponds to the width of respective first and second aperture 214,216.

Figure 5:
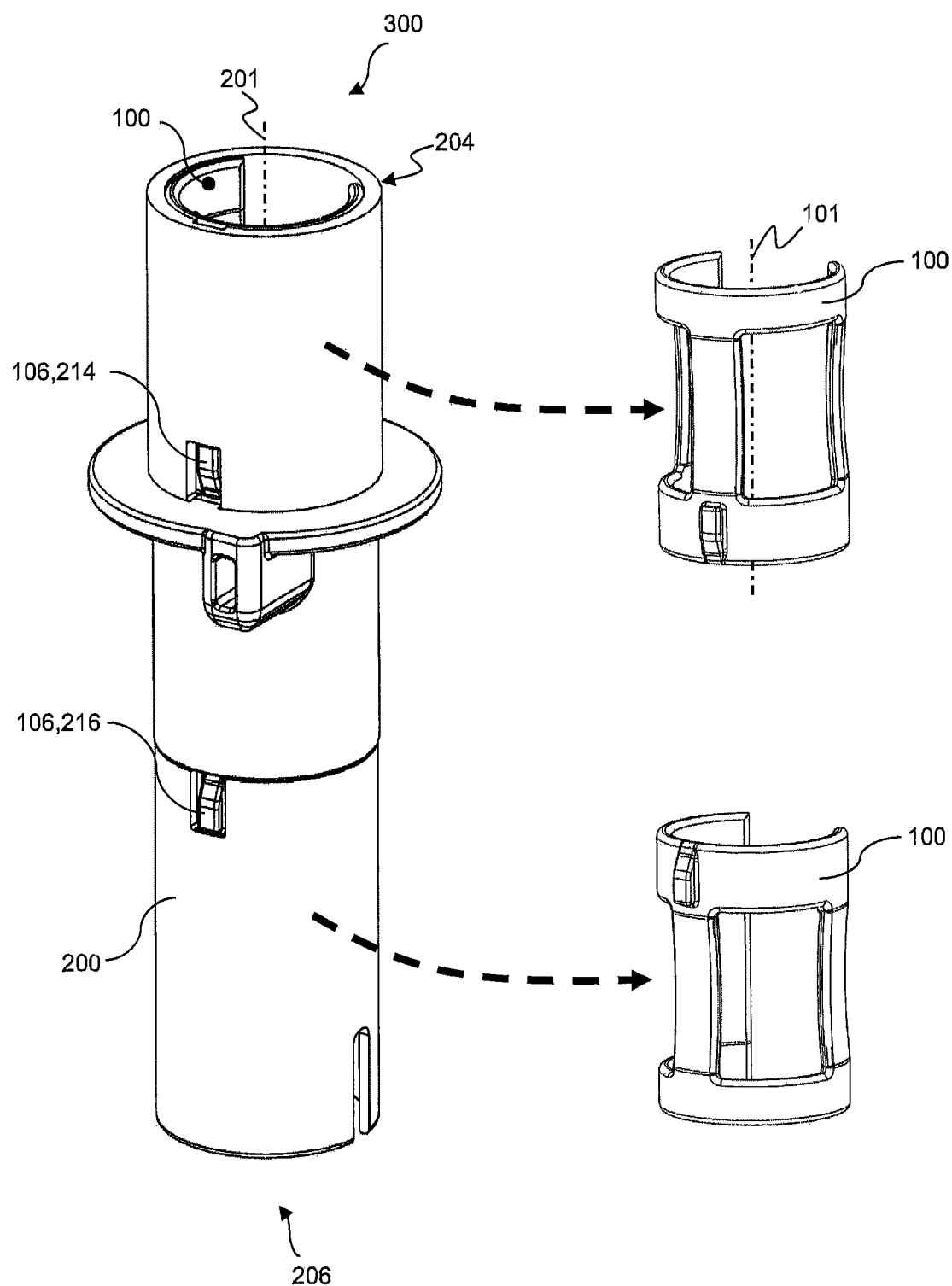
FIG. 5 illustrates an example embodiment of a sleeve assembly including the sleeve of FIGS. 4A-4C and two retainer inserts (e.g. from FIGS. 1A-1B)

FIG. 5 illustrates a sleeve assembly 300 including a sleeve 200 (right-side or left-side version) and two retainer inserts 100, each one operably mounted within the axial passage of the sleeve 200. The sleeve 200 and each insert 100 is the same as described in FIGS. 4A-4C and FIGS. 1A-1B, respectively.

Both, the retainer insert 100 and the sleeve 200 may be made from a polymer or metal material. In particular, the retainer insert 100 is made from a resilient material, such as a thermoplastic polymer, suitable for elastic deformation, or a metal, e.g. a spring steel or the like. Alternatively, the retainer insert 100 and the sleeve may be each made from different material, e.g. the sleeve 200 is made from a polymer and the retainer insert 100 is made from a metal. Furthermore, any suitable compound material or alloy may be used to manufacture any one of the sleeve 200 and the retainer insert 100.

Figure 6A:
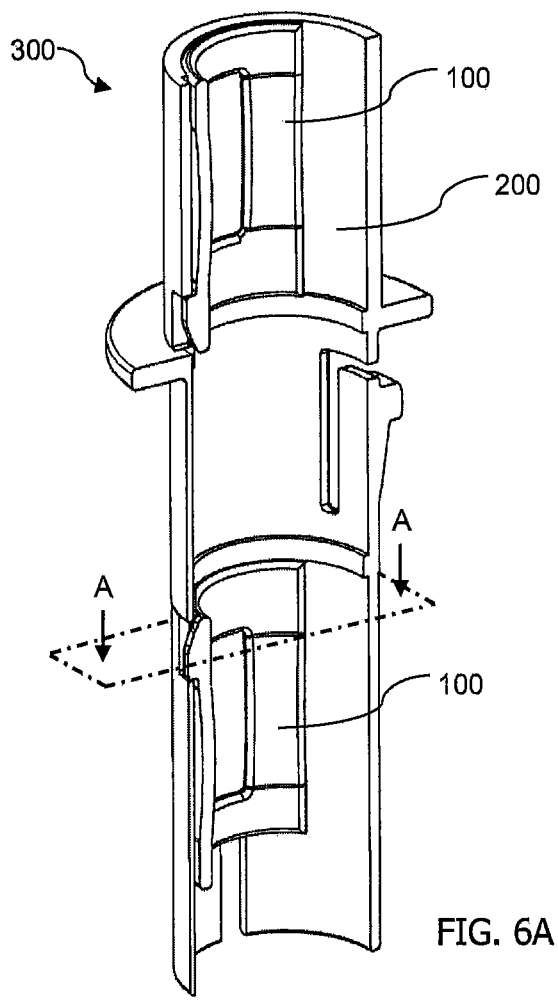
FIGS. 6A-6C illustrate the sleeve assembly of FIG. 5 in a cross-sectional side view along a central longitudinal plane, a cross-sectional top view through transverse plane A-A, and a close-up detailed cross-sectional view showing the engagement between the catch member and a corresponding aperture when mounted within the sleeve, respectively.
Figure 6B:
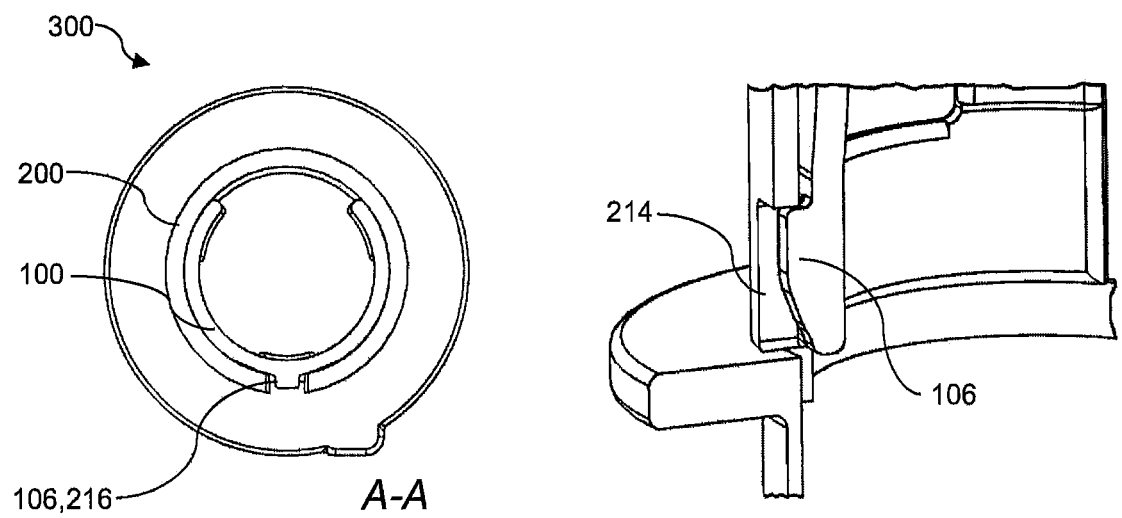
Figure 6C:
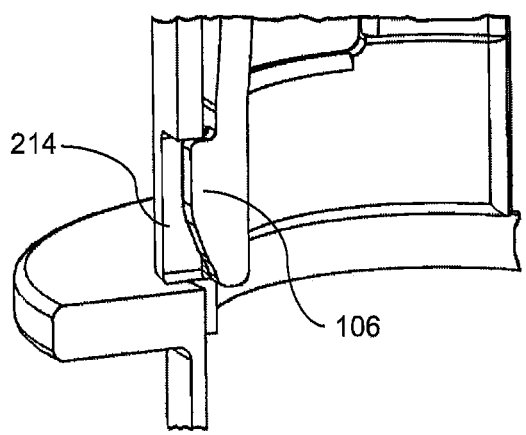

During assembly, a first retainer insert 100 may be received from the proximal end 204 into the axial passage and a second insert 100 may be received from the distal end 206 into the axial passage of the sleeve 200. In particular, the retainer insert 100 is moved with its catch member 106 forward into the axial passage along the groove 212 until the catch member 106 snaps into the aperture 214,216 and the distal edge of the retainer insert 100 abuts onto the shoulder 215,217. During movement of the retainer insert 100 through the axial passage, respective first and second spring clips 102,104 are biased into contact with the inner surface of the tubular wall 202. FIG. 6A illustrates a cross section of the sleeve assembly 300 with in situ retainer inserts 100, each one fixed within the axial passage through engagement between catch member 106 and a respective aperture 214, 216. In addition, the retainer insert 100 is prevented from moving further through the axial passage by the respective shoulder 215,217. The groove 212 further prevents any rotation of the retainer insert 100 within the axial passage (e.g. during assembly). When assembly is completed, two retainer inserts 100 are mounted within the inner axial passage of the sleeve 200 at opposing proximal 204 and distal 206 ends of the tubular wall 202. In this example embodiment, catch members 106 of the two retainer insert 100 are axially aligned on an axis parallel to the longitudinal central axis 201 of the sleeve 200. However, it is envisaged that the sleeve 200 may include apertures and grooves (on proximal and distal end portions of the sleeve) that are not axially aligned. FIG. 6B shows a cross sectional view of the sleeve assembly 300 along transverse plane A-A, showing the retainer insert 100 and catch member 106 mounted within the axial passage. FIG. 6C shows a close-up of the catch member 106 snapped into the first aperture 214 with the distal edge of the retainer insert 100 abutting the shoulder 215.

In a headrest assembly, separate sleeves 200 (left-side, right side), such as those shown in FIG. 7A-7B, are used for a left and right headrest rod 600. Each sleeve 200 may receive two retainer inserts 100 in the manner described with reference to FIG. 5.

As shown in FIG. 8A-8C, a headrest frame assembly 400 may include a sleeve assembly 300 for each side (left and right) to receive respective headrest rods 600. The sleeve assemblies 300 are mounted within a headrest frame 500. Each sleeve assembly 300 is the same as described with reference to FIG. 5. When the headrest rod 600 is moved into the inner axial passage of the sleeve assembly 300, the incurvate flexible arms 108, 110, 112 of the insert 100 contactingly engage with the rod 600 and provide a biasing force onto the headrest rod 600. Also, when the rod 600 is moved into the sleeve assembly, the flexible arms 108, 110, 112 will be pushed (bent) outwards in accordance with the diameter of the headrest rod 600. Thus, the retainer inserts 100 are able to accommodate rods 600 with a rage of varying diameters. In addition, the open-type C-shaped spring clips 102, 104 of the retainer insert 100 are adapted to provide bias and deform so as to accommodate headrest rods 600 having a range of various diameters. Thus, the retainer insert 100 provides for tolerance compensation and alignment of a headrest rod 600 within a sleeve 200, and additionally compensates for any slack between the headrest rod 600 and the sleeve 200.

Through the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract or drawings), or to any novel one, or any novel combination, of the steps of any method or process so disclosed.

It will be appreciated by persons skilled in the art that the above embodiment(s) have been described by way of example only and not in any limitative sense, and that various alterations and modifications are possible without departing from the scope of the invention as defined by the appended claims. Various modifications to the detailed designs as described above are possible.

LIST OF COMPONENTS

100 Retainer insert
101 Central axis
102 First spring clip
104 Second spring clip
106 Catch
108 First flex am
110 Second flex arm
112 Third flex arm
200 Sleeve
201 Central axis
202 Tubular wall
204 Proximal end
206 Distal end
208 Fastening clip
210 Shoulder
212 Groove
214 Aperture (proximal)
215 Proximal inner shoulder
216 Aperture (distal)
217 Distal inner shoulder
300 Sleeve assembly
400 Headrest frame assembly
500 Headrest frame
600 Headrest rod

The invention claimed is:

1. A retainer insert for an inner axial passage of a headrest sleeve device comprising:
a first annular spring clip and a second annular spring clip, coaxial to and axially spaced apart from said first annular spring clip along a longitudinal central axis, each one adapted to be received and mounted within the axial passage of the headrest sleeve device;
a plurality of incurvate flex members, arranged parallel to and circumferentially spaced apart about said longitudinal central axis and connecting said first and said second annular spring clip, adapted to biasedly engage with a headrest support rod;
wherein said retainer insert is configured such that said first annular spring clip is connected to said second annular spring clip by only said plurality of incurvate flex members.

2. A retainer insert according to claim 1, wherein each one of said first and said second annular spring clip are open-type clips adapted to retainingly engage within the inner axial passage of the headrest sleeve device.

3. A retainer insert according to claim 1, further comprising at least one catch member provided on an outer surface of any one of said first and said second annular spring clip projecting in a direction radially away from said longitudinal central axis, adapted to mountably engage with a corresponding aperture of the headrest sleeve device.

4. A retainer insert according to claim 3, wherein a footprint of said at least one catch member operably complements the footprint of the corresponding aperture of the headrest sleeve device, so as to allow a mating connection between said at least one catch member and the corresponding aperture of the headrest sleeve device.

5. A retainer insert according to claim 4, wherein said footprint of said at least one catch member is substantially rectangular.

6. A retainer insert according to claim 3, wherein said at least one catch member comprises a chamfered cam surface adapted to slidingly engage with an inner surface of the inner axial passage of the headrest sleeve and move into engagement with the corresponding aperture of the headrest sleeve device during assembly.

7. A retainer insert according to claim 1, wherein said first annular spring clip, said second annular spring clip and said plurality of incurvate flex members are integral parts made from a resilient material.

8. A retainer insert according to claim 1, comprising three circumferentially equidistantly spaced incurvate flex members.

9. A retainer insert according to claim 1, wherein each one of said plurality of incurvate flex member has a concave shape with respect to said longitudinal central axis.

10. A sleeve device assembly for a vehicle headrest, the sleeve device assembly including the retainer insert of claim 1, and further comprising:
a sleeve device, having a tubular wall defining an inner axial passage between a proximal end and a distal end extending along a longitudinal central axis;
wherein the retainer insert is operably mounted within said inner axial passage of said sleeve device, adapted to retainingly receive and guide a headrest support rod.

11. A sleeve device assembly according to claim 10, wherein said tubular wall of said sleeve device comprises at least one first aperture towards a proximal region adapted to mountingly engage with a catch member of said at least one retainer insert.

12. A sleeve device assembly according to claim 11, further comprising at least one first annular shoulder portion provided adjacent to said at least one first aperture within said inner axial passage and configured to abuttingly engage with said at least one first retainer insert when said catch member is mountingly engaged with said at least one first aperture.

13. A sleeve device assembly according to claim 12, wherein said at least one first aperture is provided within a longitudinal groove provided on an inner surface of said tubular wall and extending between said distal end and said proximal end in a direction parallel to said longitudinal central axis.

14. A sleeve device assembly according to claim 13, wherein said longitudinal groove has a width configured to operably receive said catch member of said at least one first retainer insert.

15. A sleeve device assembly according to claim 10, wherein the retainer insert comprises a first retainer insert and the sleeve device assembly further comprises a second retainer insert, the first retainer insert and the second retainer insert operably mounted within said inner axial passage of said sleeve device at opposing proximal and distal end portions of said tubular wall, and adapted to cooperate so as to retainingly receive and guide a headrest support rod.

16. A retainer insert for an inner axial passage of a headrest sleeve device comprising:
a first annular spring clip and a second annular spring clip, coaxial to and axially spaced apart from said first annular spring clip along a longitudinal central axis, each one adapted to be received and mounted within the axial passage of the headrest sleeve device;
a plurality of incurvate flex members, arranged parallel to and circumferentially spaced apart about said longitudinal central axis and connecting said first and said second annular spring clip, adapted to biasedly engage with a headrest support rod;
wherein each one of said first and said second annular spring clip are open-type clips adapted to retainingly engage within the inner axial passage of the headrest sleeve device.

17. A sleeve device assembly for a vehicle headrest, comprising:
a sleeve device, having a tubular wall defining an inner axial passage between a proximal end and a distal end extending along a longitudinal central axis;
a retainer insert for the inner axial passage, the retainer insert comprising:
a first annular spring clip and a second annular spring clip, coaxial to and axially spaced apart from said first annular spring clip along a longitudinal central axis, each one adapted to be received and mounted within said inner axial passage;
a plurality of incurvate flex members, arranged parallel to and circumferentially spaced apart about said longitudinal central axis and connecting said first and said second annular spring clip, adapted to biasedly engage with a headrest support rod;
wherein the retainer insert is operably mounted within said inner axial passage of said sleeve device for retainingly receiving and guiding a headrest support rod;
wherein said tubular wall of said sleeve device comprises at least one first aperture towards a proximal region adapted to mountingly engage with a catch member of said at least one retainer insert; and
at least one first annular shoulder portion provided adjacent to said at least one first aperture within said inner axial passage and configured to abuttingly engage with said at least one first retainer insert when said catch member is mountingly engaged with said at least one first aperture.

* * * * *